(12) United States Patent
Stewart et al.

(10) Patent No.: US 11,724,435 B2
(45) Date of Patent: Aug. 15, 2023

(54) STAND ALONE THERMOFORMING SEPARATOR FILM

(71) Applicant: Bay Materials, LLC, Fremont, CA (US)

(72) Inventors: Ray F. Stewart, Redwood City, CA (US); John Lahlouh, San Jose, CA (US)

(73) Assignee: Bay Materials, LLC., Fremont, CA (US)

( * ) Notice: Subject to any disclaimer, the term of this patent is extended or adjusted under 35 U.S.C. 154(b) by 0 days.

(21) Appl. No.: 17/365,647

(22) Filed: Jul. 1, 2021

(65) Prior Publication Data

US 2021/0323216 A1 Oct. 21, 2021

Related U.S. Application Data

(63) Continuation of application No. PCT/US2020/013191, filed on Jan. 10, 2020.

(60) Provisional application No. 62/791,798, filed on Jan. 12, 2019.

(51) Int. Cl.
| | | |
|---|---|---|
| *B29C 51/44* | (2006.01) | |
| *B29C 33/68* | (2006.01) | |
| *B29C 51/00* | (2006.01) | |
| *B29C 51/14* | (2006.01) | |
| *B29C 51/32* | (2006.01) | |
| *B29C 51/42* | (2006.01) | |

(52) U.S. Cl.
CPC ............ *B29C 51/445* (2013.01); *B29C 33/68* (2013.01); *B29C 51/002* (2013.01); *B29C 51/14* (2013.01); *B29C 51/32* (2013.01); *B29C 51/428* (2013.01); *B29C 2793/009* (2013.01)

(58) Field of Classification Search
CPC ....... B29C 51/00; B29C 51/32; B29C 51/428; B29C 51/002; B29C 33/68; B29C 51/445; B29C 51/14; B29C 2793/009; C08K 3/013; A63B 71/08; C08J 5/18; A61C 7/08; A61C 19/06; A61C 5/00; B32B 27/32
See application file for complete search history.

(56) References Cited

U.S. PATENT DOCUMENTS

| | | | | |
|---|---|---|---|---|
| 2,432,688 A | | 12/1947 | Slack, Jr. | |
| 5,503,552 A | * | 4/1996 | Diesso | ..................... A61C 9/00 433/48 |
| 5,817,386 A | * | 10/1998 | Adamko | ................. B32B 27/34 428/41.3 |
| 6,440,566 B1 | | 8/2002 | Maligie et al. | |

(Continued)

FOREIGN PATENT DOCUMENTS

| | | |
|---|---|---|
| DE | 10 2005 046309 A1 | 4/2007 |
| DE | 20 2018 102517 U1 | 5/2018 |

OTHER PUBLICATIONS

Written Opinion of the International Searching Authority from the International Searching Authority for PCT/US2020/013191, dated May 8, 2020.

(Continued)

*Primary Examiner* — Monica A Huson
(74) *Attorney, Agent, or Firm* — Gerald T. Gray; Leydig, Voit & Mayer, LTD.

(57) ABSTRACT

Improved separator film compositions, methods and systems for use in producing thermoformed dental appliances are disclosed.

16 Claims, 4 Drawing Sheets

(56) References Cited

U.S. PATENT DOCUMENTS

| | | |
|---|---|---|
| 7,758,346 B1 | 7/2010 | Letcher |
| 2006/0019099 A1 | 1/2006 | Wang et al. |
| 2009/0017421 A1 | 1/2009 | Letcher |
| 2011/0088701 A1 | 4/2011 | Thornton |
| 2020/0113651 A1* | 4/2020 | Hirsch .................... B32B 27/36 |

OTHER PUBLICATIONS

International Preliminary Report on Patentability from the International Searching Authority for PCT/US2020/013191, dated Jun. 16, 2021.

Supplementary European Search Report form the European Patent Office for EP Application 20 738 108, dated Aug. 25, 2022.

\* cited by examiner

STAND ALONE THERMOFORMING SEPARATOR FILM

CROSS-REFERENCES TO RELATED APPLICATIONS

This application claims the benefit of International Application No. PCT/US2020/013191 filed on Jan. 10, 2020 and U.S. Provisional Application No. 62/791,798 filed Jan. 12, 2019. Both applications are incorporated herein by reference in their entirety.

TECHNICAL FIELD

Improved separator film compositions, methods and systems for use in producing thermoformed articles.

BACKGROUND

Thermoforming is a process whereby a heated thermoplastic sheet material is formed over a mold, which may be either male or female, to impart a desired shape to the sheet which is subsequently cooled to lock in that shape resulting in a thermoformed article.

It is necessary that the thermoformable sheet material not bond to the mold, be easily released, that there be no transfer of material or chemical reaction between the mold and the thermoformable sheet material, and that imperfections in the mold not be transferred to the thermoformed part.

A particular area of interest is the production of dental or orthodontic appliances including but not limited to aligners, retainers, splints, sports mouth guards, indirect bonding appliances and bleaching trays. Such dental and orthodontic appliances can be custom-made to fit a patient by using a model of the patients' dentition as the mold for thermoforming.

To facilitate the molding and removal of thermoformed articles from models, separator films (also referred to as "separation films"), may be used. Such separator films are commonly applied as a liquid by spraying, dipping, or painting a film forming material onto the model. Often it is then necessary to allow the separating material to dry or cure before it can be thermoformed over. Examples of commercial separator film products include: Co-Sep liquid separator marketed by CG America and Triad Mold Release Agent, marketed by Dentsply. U.S. Pat. No. 2,432,688 describes an alginate based release (or separator) film which may be applied to models. Other commercial dental separator materials may be polymer solutions or emulsions, dispersed waxes, dispersed silicone polymers, surfactants or other agents.

Separator films used to prevent chemical reactions or transfer of materials occurring between a model and the thermoformed article, include various block out materials such as wax or putty may be applied to a model to cover undercut areas or make other modifications.

Some dental thermoformable sheet materials, for example polyester, acrylic or polycarbonate, may be supplied with one or more surfaces covered with a protective film to prevent scratching or surface abrasion during shipping and handling. These films are typically a polyolefin such as polyethylene with a low tack adhesive used to fix them to the film. In general, the adhesive is an acrylic pressure sensitive adhesive, a rubber-based material, or a soft polymer. In addition to providing handling protection, some of these films can act as a separator film provided that they are compatible with thermoforming and do not become permanently bonded during the thermoforming process or stick to the model. These films must be carefully selected and pre-applied to the thermoformable material, typically by heat or pressure lamination adding an additional step in production. An example of a dental thermoformable sheet with integrated separation film is the "Track A and Track B" materials marketed by Forestadent, Germany, which is a copolyester thermoformable sheet with a polyethylene protective film.

In the case where the model (or mold) to be thermoformed on is not smooth, for example when made by 3D printing, or cast from plaster or dental stone, an undesired optical finish may be transferred to the thermoformed article. This is particularly a problem in the manufacture of orthodontic aligners. The undesirable surface finish may make the aligner look hazy or grey. Additionally, the rough surface may promote deposition of calcium deposits from saliva and provide difficult to clean surfaces where bacteria may accumulate.

Some types of thermoformable sheet material are not available with protective liners due to their resistance to adhesion, or they may be chemically incompatible with the liner material or the adhesive used to attach it. It can be time consuming and costly to apply a protective film to thermoformable sheets and the process typically requires specialized equipment.

Although many separator films are on the market, there remains a need for a separator film that is cost effective, improves surface quality, does not require time consuming additional manufacturing steps and can be used with a wide variety of models and thermoformable materials. A particular need exists for such a separator film for use in the manufacture of dental appliances.

BRIEF SUMMARY

Detached releasable separator films for use in thermoforming dental appliances are provided.

The detached releasable separator films may comprise a polyolefin having an average thickness of from about 37 to 75 microns; a minimum X or Y dimension of about 110 mm; a maximum X or Y dimension of about 150 mm; a melting point of from about 80° C. to about 160° C.; a modulus of from about 50 to 700 MPa; and a MD and XD orientation of less than 100%.

The detached releasable separator film may comprise a single layer; two or more layers wherein one layer has a higher melting point than another layer; or three layers or more layers wherein an inner layer has a higher melting point than either outer layer.

The detached releasable separator film may further comprise one or more of the following characteristics: a trouser tear strength of greater than 20 N/mm (Newtons/mm); two or more radial slits, each greater than about 10 mm in length; two or more triangular cuts, comprising from about 5% to about 50% of the total area; a conical or spherical shape wherein the Z axis has a height of greater than about 10 mm; a slip or mold release agent selected from the group of amides, esters and siloxanes; or from 0.1 to 2% of an anti-block additive selected from silica, diatomaceous earth, talc, and calcium carbonate.

The detached releasable separator film may comprise a polyethylene and have a melt index according to ASTM D1238 at a temperature of 230° C. with a load of 2.16 Kg of less than 10, preferably less than 5, or less than 1.

The detached releasable separator film may be provided as a "stack" or plurality of individual separator films provided between aligner materials, wherein the aligner materials may be the same or different.

Also provided are methods and systems for producing a thermoformed article using a detached releasable separator film as described herein.

According to one embodiment, a detached releasable separator film for use in thermoforming a dental appliance is provided that includes (a) a material having a melt index according to ASTM D1238, at a temperature of 230° C. with a load of 2.16 Kg, of less than 10; and (b) a trouser tear strength of greater than 20 N/mm.

According to another embodiment, a detached releasable separator film for use in thermoforming a dental appliance is provided that includes (a) a material having a melt index according to ASTM D1238, at a temperature of 150° C., with a load of 2.16 Kg, of from about 2 to 50; and (b) a trouser tear strength of greater than 20 N/mm.

According to yet another embodiment, a method of producing a thermoformed article is provided. The method includes the steps of: positioning a detached releasable separator film over a male or female dental mold or model; heating a thermoformable sheet material to a temperature greater than the melting point of the detached releasable separator film; thermoforming the heated sheet material over the detached releasable separator film and mold or model in a thermoforming device; separating the thermoformed article from the mold or model; and removing the detached releasable separator film from the thermoformed article and the mold or model, producing a thermoformed article.

According to a further embodiment, a system for producing a thermoformed dental appliance is provided that includes a male or female mold or model; a thermoformable sheet material; a detached releasable separator film comprising (i) a material having a melting point which is lower than a thermoforming temperature of the thermoformable sheet material; and (ii) a trouser tear strength of greater than 20 N/mm; and a thermoforming device.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION

Figure 1A:
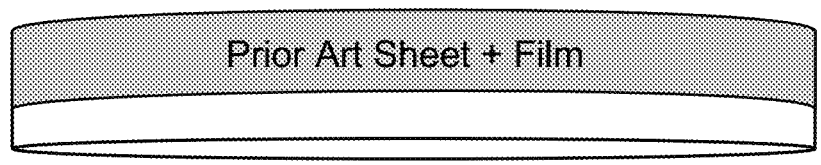
FIG. 1A is a schematic depiction of a prior art thermoformable sheet with a protective film laminated to, or bonded on one side.
Figure 1B:
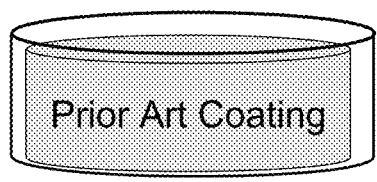
FIG. 1B is a schematic depiction of a thermoforming mold (model) coated with a release material.
Figure 1C:
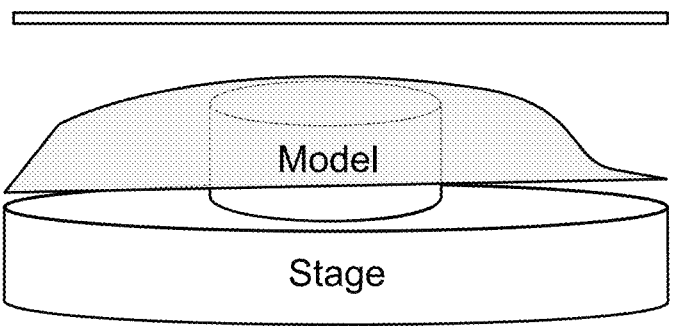
FIG. 1C is a schematic depiction of a side view of a stand-alone separator film placed over a thermoforming mold (model) before thermoforming.
Figure 1D:
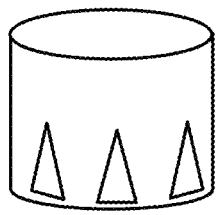
FIG. 1D is a schematic depiction of a separator film after thermoforming showing areas where the film has folded (exemplified by dark triangles).

All patents, publications, and patent applications cited in this specification are herein incorporated by reference as if each individual patent, publication, or patent application was specifically and individually indicated to be incorporated by reference in its entirety for all purposes.

Unless defined otherwise, all technical and scientific terms used herein have the same meaning as commonly understood by one of ordinary skill in the art to which the invention pertains. Other methods and materials similar, or equivalent, to those described herein can be used in the practice of the present invention.

In describing and claiming the present invention, the following terminology will be used in accordance with the definitions set out below.

As used in this specification and the appended claims, the use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

The term "aligner" is used with reference to a tight-fitting custom-made shell that fits over the teeth and is used in orthodontic treatment.

The term "dental appliance" is used herein with reference to any device placed in or on the teeth or gums of a subject. Dental appliances include but are not limited to orthodontic, prosthetic, retaining, snoring/airway, cosmetic, dentures, therapeutic and habit-modification devices.

The expressions "modulus", "Young's modulus", and "elastic modulus" are used herein with reference to the rigidity of a material and/or resistance of the material to stretching. The higher the modulus of the material, the more rigid. For polymers, the mechanical properties including elastic modulus and other properties may be measured as proscribed by ASTM D 638 or in the case of softer materials the 1% secant modulus may be measured as proscribed by ASTM D882.

The term "flexural modulus" is used herein with reference to the rigidity of a material and/or resistance of the material to deformation in bending. The higher the flexural modulus of the material, the more resistant to bending it is. For an isotropic material the flexural modulus and elastic modulus are nearly the same. Flexural modulus may be measured by the test listed in ASTM D790, and uses units of force per area. Unless designated otherwise, "modulus" refers to elastic modulus.

The terms "mold", "model" and "substrate" are used interchangeably herein with reference to objects used to impart desired shapes to materials during a forming operation such as thermoforming or compression or injection molding.

The term "polymeric sheet" is used interchangeably herein with the term "plastic sheet".

The term "releasable film" as used herein means a film which after application to a substrate can be substantially removed without damage to either the substrate or the film itself.

The term "retainer" is used herein with reference to a dental appliance used to hold teeth in their correct position especially following orthodontic treatment.

The term "separator film" as used herein refers to materials that form a physical barrier between a model and one or more materials being formed over the model.

The term "shell" is used herein with reference to polymeric shells which fits over the teeth and are removably placeable over the teeth.

The term, "thermoforming temperature", as used herein means the temperature of a polymeric sheet when it is thermoformed.

The term "thermoplastic polymer" is used herein to denote a polymer which is relatively hard at a lower temperature, which becomes pliable or moldable when subjected to heat and pressure, and again becomes relatively hard when cooled, provided that the heat and pressure do not chemically alter the polymer.

The term "thermosetting polymer" is used herein to denote a polymeric composition which is a solid or viscous material at a relatively low temperature and which, when subjected to heat and/or suitable radiation, and/or when the material undergoes one or more chemical reactions, changes irreversibly into an infusible polymer network. The term thermoset polymer is used to denote a cured thermosetting polymer.

The terms "tooth" and "teeth" include natural teeth, including natural teeth which have been modified by fillings or by crowns, implanted teeth, artificial teeth that are part of a bridge or other fitting secured to one or more natural or implanted teeth, and artificial teeth that may be permanent or are part of a removable fitting.

The improved compositions, methods and systems described herein provide a solution to an unmet need in the thermoforming and dental appliance fabrication industries. Currently, a thermoplastic sheet is placed over a model and thermoformed to make a thermoformed article. It is difficult to make a clean thermoformed part that lacks surface imperfections and is clear. Frequently, upon removal of the thermoformed article from the model, wax or another material is transferred to the thermoformed article and/or imperfections such as ridges are present in the thermoformed article resulting in undesired cosmetic and/or optical properties. In addition, it is often difficult to remove the thermoformed article from the model due heat and pressure induced adhesion or topological factors.

The compositions, methods and systems disclosed herein are cost effective, provide for (1) improved surface quality and optical transparency of thermoformed articles; (2) ease of removal from the model and thermoformed article; (3) physical, and or chemical isolation between a model and a thermoformed article; (4) good tear and splitting resistance; (5) do not require time consuming additional manufacturing steps; and (6) can be used with a wide variety of models and thermoformable materials.

Currently, when a separator film is useful or required during the thermoforming process and is not provided on the thermoformable sheet being used, the user must resort to one of two methods which require additional steps and cost.

The user may thermoform a thin inert plastic sheet over the model, allow it to cool and then thermoform a second time with the desired thermoformable material on top.

In the dental appliance field, an example of such a sheet is Isofolan™, a 0.1 mm thick polyethylene sheet, available from Great Lakes Orthodontics and Scheu Dental. A description of a process where a thin inert plastic sheet is thermoformed over the model is provided in U.S. Pat. No. 7,758, 346 B1. It is well known in the field of thermoforming dental appliances that a plastic film, such as Isofolan must be heated above its melting point to be formed over a model, and that acceptable adaptation further requires pressure or vacuum forming. A test to evaluate this approach is described in Example 1 and the results indicated that the process does not work well.

Alternatively, the user may apply a liquid separator material to the model, for example, the Triad Mold Release Agent available from Dentsply, and allow it to dry before thermoforming. A number of liquid separating films are on the market, however, they typically require time consuming drying before molding and careful cleaning to remove residues after thermoforming. Additionally, most liquid separator materials do not address optical defects in the model or thermoformed appliance.

The compositions, methods and systems disclosed herein allow a user to rapidly complete the thermoforming process in a single step, resulting in a clear thermoformed article that has little to no surface imperfections and is easily removed from the model after thermoforming. These compositions, methods and systems rely on use of the separator films detailed herein such that the user can simply place the film on top of the model before thermoforming.

Common deficiencies in the prior art include a lack of optical transparency (cloudiness) of thermoformed parts, a lack of ready (easy) removal from the model and/or thermoformed article, and the presence of crease lines on the thermoformed article.

Figure 2A:
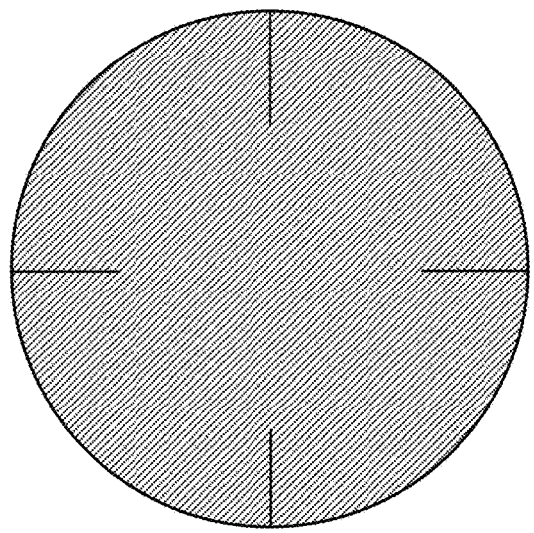
FIG. 2A is a schematic depiction of an exemplary separator film with 4 radial slits.
Figure 2B:
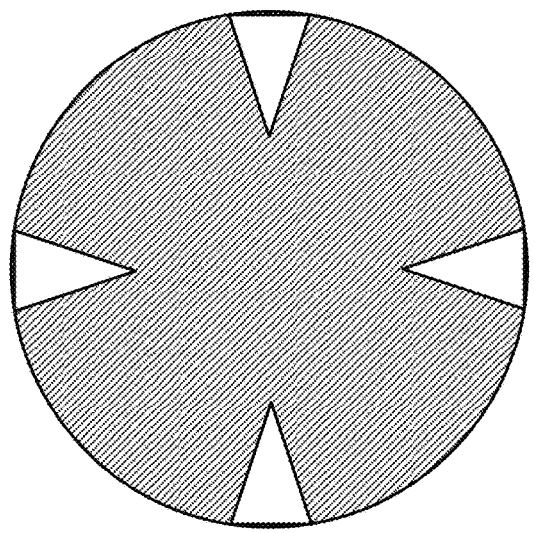
FIG. 2B is a schematic depiction of an exemplary separator film with 4 triangular sections removed.
Figure 2C:
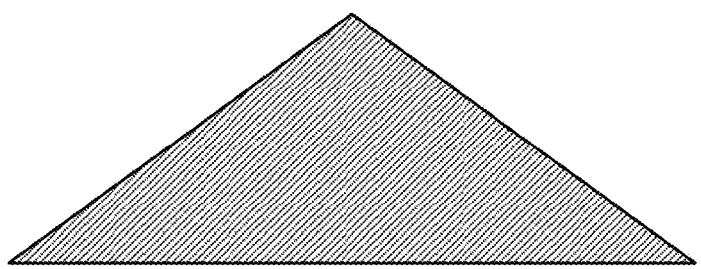
FIG. 2C is a schematic depiction of a side view of an exemplary circular separator film having a cone shape.
Figure 2D:
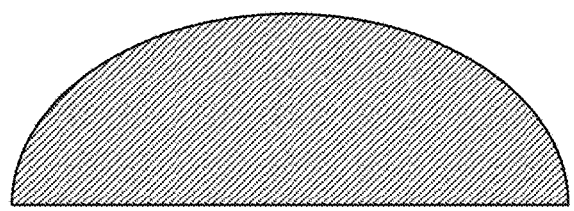
FIG. 2D is a schematic depiction of the side view of an exemplary separator film having a hemispheric shape.
Figure 2E:
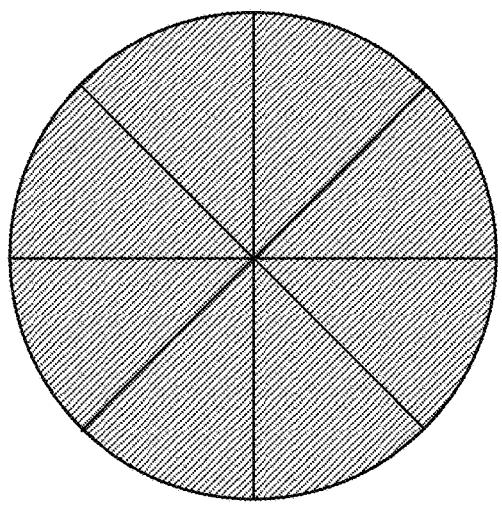
FIG. 2E is a schematic depiction of the top view of an exemplary separator film having creases to promote controlled folding.
Figure 3A:
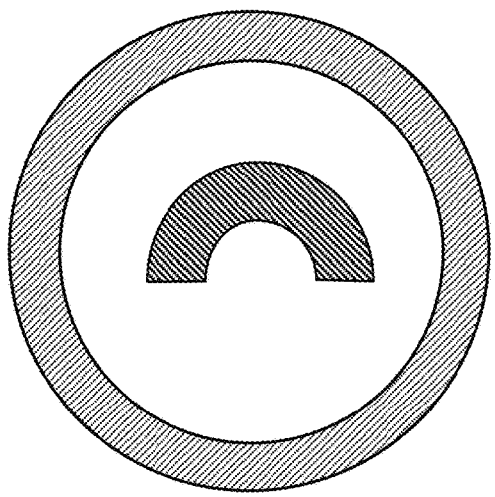
FIG. 3A is a schematic depiction of the top view of an exemplary separator film and model on a thermoforming stage.
Figure 3B:
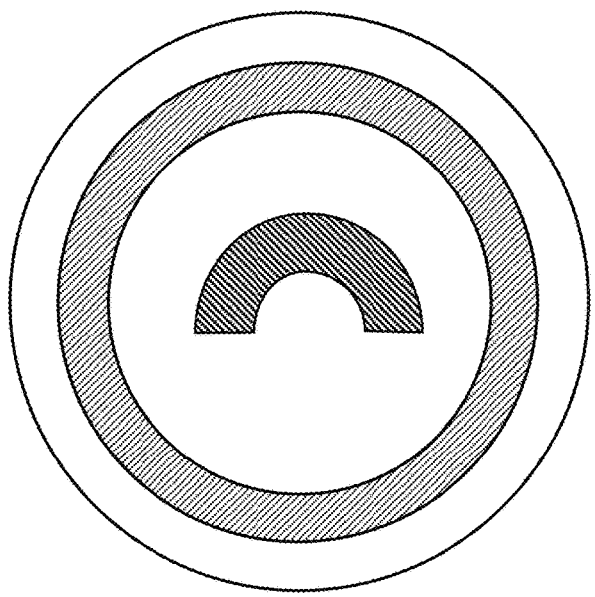
FIG. 3B is a schematic depiction of the top view of an exemplary separator film and model on a thermoforming stage.
Figure 4A:
FIG. 4A is a schematic depiction of a single layer separator film.
Figure 4B:
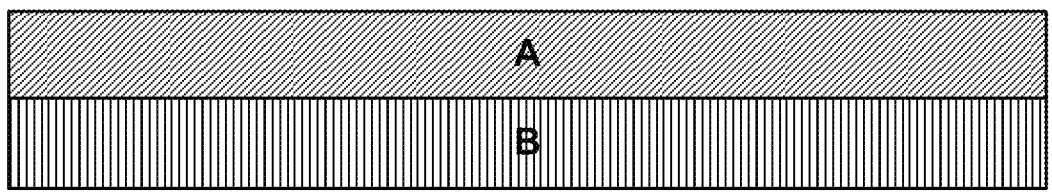
FIG. 4B is a schematic depiction of a two layer separator film. The "A" layer of a two layer separator film may be the same or different than the "B" layer of a two layer separator film, and the B layer may have higher melt flow than the A layer.
Figure 4C:
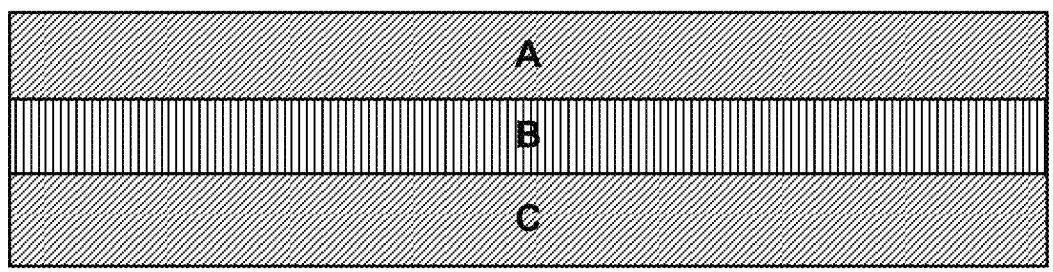
FIG. 4C is a schematic depiction of a three or more layer separator film. A layer of a three or more layer separator film may be the same or different than the other layers of the separator film.

Crease lines are generally the result of folding of the separator film resulting in differing thicknesses such that crease lines result where folding occurs. It is desirable to limit the amount of folding. As disclosed herein, folding is minimized by using separator films, for example: (1) having slits in the outer portion of the film in the radial direction; (2) with removal of pie slice shaped sections; (3) with radial creases; (4) where removal of a triangular shaped section that is converted to a cone shape; (5) that are concave to better fit over models; and (6) that are flute shaped and conform better to the model. See e.g., FIGS. 2 A, B, C, D, and E.

Separator films may be circular, rectangular, square or another shape and may be smaller or larger than the thermoplastic sheet being thermoformed.

The present disclosure is based on the discovery that many of the deficiencies in prior art separator films can be reduced or eliminated with the improved separator films described herein.

In one embodiment, the separator film is a detached releasable separator film, for example a detached releasable polyolefin separator film.

In one embodiment, the detached releasable separator film has a melting point which is lower than the thermoforming temperature.

In one embodiment, the melting point which is lower than the thermoforming temperature is from about 60° C. to about 200° C., about 70° C. to about 160° C., about 80° C. to about 150° C., 70° C., 75° C., 80° C., 85° C., 90° C., 95° C., 100° C., 105° C., 100° C., 115° C., 120° C. or 125° C.

In one embodiment the film comprises a polypropylene co-polymer having a melting point of from about 120° C. to about 160° C. and a melt index according to ASTM D 1238 (at 230° C. with a load of 2.16 Kg) of less than 10, less than 5, less than 1.

In one embodiment, the detached releasable separator film has a melt index measured according to ASTM D1238 (at 150° C., with a load of 2.16 Kg) of from about 1 to 50, 2 to 50, or 5 to 30. The detached releasable separator film melt index may be greater than 10, greater than 20, or greater than 30.

In one embodiment, the detached releasable separator film has a melt index measured according to ASTM D1238 (at 230° C., with a load of 2.16 Kg) of less than 10, preferably less than 5, and preferably less than 1.

In one embodiment, the detached releasable separator film comprises polyethylene (PE), for example, high density polyethylene, low density polyethylene, linear low density polyethylene including very low density polyethylene, ethylene co-polymers including polyethylene with one or more co-monomers, including but not limited to vinyl acetate, acrylic acid, methacrylic acid, methyl acrylate, ethyl acrylate, and butyl acrylate.

In one embodiment, the detached releasable separator film comprises an ethylene, alpha olefin copolymer wherein the co-monomer is one or more of propylene, butene, hexene or octane.

In one embodiment the detached releasable separator film comprises a polypropylene, for example, a random co-polymer or block co-polymer, having a melting point from about 60° C. to about 150° C.

In one embodiment, the detached releasable separator film is a polyolefin film comprising polyethylene or a polyethylene co-polymer wherein the co-monomer is one or more of vinyl acetate, methyl, ethyl or butyl acrylate, acrylic acid or methacrylic acid, propylene, butene, hexene or octene.

In one embodiment, the detached releasable separator film comprises a modulus of from about 50 to 700 MPa, for example, 100 MPa, 150 MPa, 200 MPa, 250 MPa, 300 MPa, 400 MPa, or 500 MPa.

In one embodiment, the detached releasable separator film comprises a MD ("machine direction") and TD ("transverse direction") orientation of less than about 100%, 50%, or 25%.

In one embodiment, the detached releasable separator film has a trouser tear strength of greater than 20 N/mm (Newtons/mm).

In one embodiment, the detached releasable separator film comprises a single layer.

In one embodiment, the detached releasable separator film is a polyolefin with an average thickness of from about 37 to 75 microns (p).

In one embodiment, the detached releasable polyolefin separator film has one or more of a melting point of from about 80° C. to about 125° C., a modulus of from about 50 to 700 MPa and a MD and TD orientation of less than 100%, and in some cases less than about 50%.

In one embodiment, the detached releasable separator film has a minimum X or Y dimension of about 110 mm and a maximum X or Y dimension of about 150 mm.

In one embodiment, the detached releasable separator film comprises two or more layers and one layer has a higher melting point than the other layer. In one example of this embodiment, one of the layers has a melt index of greater than 10.

In one embodiment, the detached releasable separator film comprises three layers and the inner layer has a higher melting point than either outer layer.

In one embodiment, the detached releasable separator film comprises two or more radial slits, for example, slits greater than about 10 mm in length.

In one embodiment, the detached releasable separator film comprises two or more triangular cuts, for example, cuts comprising from about 5% to about 50% of the total area.

In one embodiment, the detached releasable separator film comprises a conical or spherical shape and the Z axis may have a height of greater than about 10 mm.

In one embodiment, the detached releasable separator film comprises a slip or mold release agent selected from the group of amides, esters and siloxanes.

In one embodiment, the detached releasable separator film comprises from 0.1 to 2% of an anti-block additive selected from silica, diatomaceous earth, talc, or calcium carbonate.

The detached releasable separator films disclosed herein have one or more of the characteristics described in the embodiments listed above.

In one embodiment, a detached releasable separator film for use in thermoforming dental appliances comprises a polyolefin having an average thickness of from about 37 to 75 microns, a minimum X or Y dimension of about 110 mm, a maximum X or Y dimension of about 150 mm, a melting point of from about 80° C. to about 160° C., a modulus of from about 50 to 700 MPa and a MD and XD orientation of less than 100%, and in some cases less than about 50%.

In one embodiment, a detached releasable separator film having one or more of the characteristics described in the embodiments listed above is used in a method of producing a thermoformed article, e.g., a dental appliance.

In one embodiment of the method, a detached releasable separator film is positioned over a male or female dental mold or model and a thermoformable sheet material is heated to a temperature greater than the melting point of the releasable separator film in a pressure or vacuum thermoforming device and placed over the releasable separator film and the mold or model to produce a thermoformed article. After thermoforming, the separator film is removed from the thermoformed article and from the model.

In one embodiment of the method, the detached releasable separator film is removed from the thermoformed article and the model without a chemical reaction occurring between the thermoformable sheet material and the model.

In one embodiment of the method, the detached releasable separator film is removed from the thermoformed article and the model without transfer of material from the model to the thermoformable thermoformed article.

In one embodiment of the method, the detached releasable separator film is removed from the thermoformed article and the model wherein the surface roughness of the thermoformed part is reduced relative to the model.

In one embodiment of the method, detached releasable the separator film is removed from the thermoformed article and the model wherein the gloss of the thermoformed part is increased relative to a thermoformed part formed without the separator film.

In one embodiment, a detached releasable separator film having one or more of the characteristics described in the embodiments listed above is a component of a system for producing a thermoformed article, e.g., a dental appliance.

In one embodiment, the system comprises (a) a male or female mold or model; a detached releasable polyolefin separator film; a polymeric thermoformable sheet material; and a thermoforming device.

Dental appliances may be constructed by thermoforming a thermoformable polymeric sheet material over a model of one or more teeth. The thermoformable polymeric sheet material may comprise one or more layers. The thermoforming process may be carried out using a pressure thermoforming device ("thermoformer") or a vacuum thermoforming device or a combination of vacuum and pressure Thermoforming of sheets to produce test samples or dental appliances may be performed for example using a "Biostar" pressure thermoformer available from Great Lakes Orthodontics using procedures commonly used in the industry.

Examples of commonly used thermoformable sheet materials include Zendura A (a rigid polyurethane available from Bay Materials, LLC), Essix Ace (a polyester available from Dentsply), Duran (a polyester available from Schue Dental) and Imprelon, (a polystyrene available from Scheu Dental.

Exemplary materials for use in construction of the detached releasable separator films disclosed herein include, but are not limited to, polyethylene (PE) including high density polyethylene, low density polyethylene, linear low density polyethylene including very low density polyethylene, ethylene co-polymers including polyethylene with one or more comonomers including, but not limited to vinyl acetate, acrylic acid, methacrylic acid, methyl acrylate, ethyl acrylate, and butyl acrylate, alpha olefins including propylene, butene, hexene and octene, and polypropylene including random co-polymers and block co-polymers, including ethylene or alpha olefin and propylene co-polymers having melting points from about 60° C. to about 160° C.

Evaluation of Utility. To be useful as a stand-alone separator film a number of conflicting requirements must be attained simultaneously. After thermoforming, the film needs to remove cleanly from the substrate and the model, the thermoformed article should have a smooth surface with good optical appearance and the thermoformed article must conform closely to the dimensions of the model used. The improved separator films disclosed herein are detached releasable separator films that meet these requirements.

Exemplary Materials and Methods

Materials, methods, systems and examples for the manufacture of dental appliances are provided herein to illustrate the features of the improved release liner compositions, methods and systems disclosed herein.

Models for thermoforming may be, for example, plaster or 3D printed models, or any model where it is known to use separator films. In one illustrative embodiment, a tooth model is created by casting dental stone using a silicone dental impression according to standard methods routinely employed in the art. The cast model is trimmed and imperfections repaired. Alternatively, a model is produced by 3D printing or stereolithographic printing (SLA).

Thermoformable sheets may comprise one or more layers. Single layer thermoformable sheets, e.g., rigid polyurethane or polyester sheets may be prepared by extrusion or molding. Multilayer thermoformable sheets may be prepared by a number of means including without limitation, hot or cold lamination, adhesive lamination, melt lamination, coextrusion or other known methods. Sheets may be fully prepared before forming into an orthodontic appliance, or an appliance may be produced using a sequence of individual thermoforming steps to create multiple layers.

Thermoforming Process. Thermoforming of sheets to produce test samples or dental appliances was performed using a "Biostar" (Scheu Dental) pressure thermoformer available from Great Lakes Orthodontics using procedures commonly used in the industry and 0.76 mm thick Zendura A polyurethane as the thermoformable material (available from Bay Materials, LLC), unless otherwise stated.

Thermoforming may be conducted using different conditions, forms or models to vary draw ratio and part thickness. Multilayer dental appliances may be fabricated by multiple steps using single or multilayer thermoformable sheets or in a single step using multilayer thermoformable sheets or through one or more 3D printing processes or by sequential dip coating, spray coating, powder coating or similar processes known for producing films, sheets and 3D structures.

Orthodontic or geometric models were prepared by 3D printing, casting with a thermoset polyester resin, an epoxy casting resin, or were machined from polyacetal or aluminum.

Melt Index (MI) is a measure of the viscous flow of polymer at elevated temperature and may be measured according ASTM D1238. Melt Index may be measured under different conditions depending on the melting or softening point and viscosity of the material. Unless otherwise indicated, melt index values were measured at 190° C. with a load of 2.16 Kg, (condition E).

Melting Point. Thermal properties were measured using a differential scanning calorimeter at 10° C. per minute and second heat results for melting onset, (Mp), and heat of fusion (J/g) reported.

Mechanical Properties. Unless otherwise specified, mechanical properties were measured using an Instron Materials tester.

Applicable test methods include; tensile properties, (ASTM D638), tear strength (ASTM D1938), and 90 degree peel adhesion strength was measured using an Instron materials tester at a speed of 5 cm per minute. It is understood that test modifications may be needed or desired depending on test sample geometry or properties and some reported tests may not be based on an ASTM standard.

Film orientation was determined by measuring sheet dimension in the machine and transverse direction before (Li) and after heat treating (La) at a temperature slightly below the melting point and calculating the percent reduction in length (shrinkage). Shrink (%)=100×[Li−La]/Li.

Optical and surface properties of materials before and after thermoforming over models with and without releasable films were judged by eye and reported or measured using a BYK Colorimeter and Gloss Meter or surface roughness gauge.

The force required to remove a thermoformed article from a model may be judged by hand or may be measured with the aid of a tensile tester and suitable fixturing.

Candidate separator films were obtained from commercial suppliers when possible, for example Isofolan from Schue Dental, Densilk form Reliance Orthodontics, by removal of protective films from commercial thermoformable sheet such as Essix Ace, or suppliers of plastic films. If suppliers did not report material composition measurement of infrared spectra and thermal properties (melting point) is used to determine their properties and composition.

Additional films were prepared by melt pressing known commercial polymer resins or by extrusion or co-extrusion of materials, for example by blown film co-extrusion using a multilayer die.

EXAMPLES

The disclosure is further illustrated by the following examples. The examples are provided for purposes of example only. They are not to be construed as limiting the scope or content of the invention in any way.

Comparative Examples

Example 1A

A printed dental arch model approximately 20 mm tall was placed on the thermoforming stage of a Biostar pressure former (available from Great Lakes Orthodontics). Next, a 125 mm round sheet of Isofolan, 100 micron (p) thick (polyethylene) was placed on top of the model. A sheet of Zendura thermoformable material 125 mm in diameter and 0.76 mm thick was heated and thermoformed over the model. The model was removed from the thermoformed sheet and the Isofolan was removed from the thermoformed sheet. Upon inspection it was observed that the Isofolan sheet had folded over itself in multiple locations over the teeth and gingival area of the thermoformed appliance (article). The thermoformed appliance was unacceptable because there were multiple crease lines on the areas covering the teeth. When the thermoformed appliance was placed back over the model it fit loosely, not snuggly as required.

In contrast, using a more time-consuming process, the Isofolan sheet was first pressure formed over the model and allowed to cool. Then, a sheet of 0.76 mm Zendura was thermoformed over it, resulting in an appliance which was smooth, had no fold lines and fit more snuggly. The snug fit was attributed to the fact that the Isofolan stretched and was significantly thinned during thermoforming.

This evaluation demonstrated that simply placing a thermoplastic film designed to be thermoformed over a model and then thermoforming on top of it produces a poor and unacceptable result.

Example 1B

A second test was conducted using the commercial product, Densilk, available from Reliance Orthodontics. This material is a LDPE film 25 microns thick marketed for use in producing dentures by heat curing acrylic paste where it is desired to prevent acrylic resin from bonding to dental stone. This material is not marketed for or reported to have been used in thermoforming.

The Densilk film was placed over the printed model and evaluated in the same manner as the Isofolan. After removal of the printed model the Densik film was torn and difficult to remove from the thermoformable sheet. Additionally, the dental appliance showed numerous ridge lines on the inside matching the 3D print build lines of the model. It was apparent from this evaluation that simply placing a thermoplastic film designed to be used in casting acrylic resin into a plaster model is not acceptable as a separator film for thermoforming over printed dental appliances.

Example 2. Preparation of Separator Film Samples

Experimental separator films were sourced or prepared and characterized as listed in Table 1.

TABLE 1

| Film | Film Properties | | | Fold Lines on | | Removal | |
| --- | --- | --- | --- | --- | --- | --- | --- |
| | Melting Point | Melt Index (190° C.) | Thickness (u) | Part Distance (mm) | Number | Depth (u) | Ease of Removal |
| Isofolan (HDPE) | 132 | <0.5 | 100 | 23 | 14 | 89 | Very Easy |
| LDPE | 122 | 2 | 50 | 20 | 13 | 58 | Very Easy |
| LDPE | 120 | 30 | 50 | 18 | 12 | 41 | Very Easy |
| LLDPE | 112 | 35 | 50 | 20 | 13 | 33 | Easy |
| LDPE + Branched LDPE | 80 | 73 | 50 | 17 | 9 | 20 | Moderate |
| EVA (28% VA) | 80 | 120 | 50 | 15 | 9 | 15 | Difficult |
| Ethylene co butyl acrylate | 93 | 9 | 50 | 18 | 12 | 25 | Difficult |
| SIS block co-polymer | NA | <1 | 50 | 34 | 13 | 75 | Very Easy |

Additional films were prepared by compression molding commercial pellets of polyethylene and ethylene vinyl acetate (EVA) co-polymers having known compositions and melt index values.

Example 3. Effect of Separator Film Thickness on Gloss

A smooth polyacetal block was fabricated having approximate L×W×H dimensions of 80 mm×50 mmm×10 mm. Zendura A polyurethane sheets were thermoformed over the block, cooled and removed. The gloss value of the surface formed against the block was measured. Next, a polyester mesh fabric was placed over the block and thermoformed onto it and the resulting surface gloss was measured. Then, candidate separator films were placed on top of the polyester fabric and thermoforming onto the fabric was conducted as before. The films were separated, the separation force was noted and the gloss level of the thermoformed sheet was measured. The results as shown in Table 2 demonstrate that: Films less than about 30 microns thick may not provide a smooth surface and high gloss; a moderate (<18%) level of vinyl acetate improved flow and gloss; higher levels of vinyl acetate caused the film to adhere to the polyester fabric and the thermoform sheet; and the multilayer film exhibited improved strength and removability while maintaining good optical properties.

TABLE 2

| Film Designation | Film Composition | Film Construction | Film Thickness (u) | Gloss | Ease of Removal |
|---|---|---|---|---|---|
| None | NA | NA | NA | 11 | NA |
| LDPE | LDPE | Monolayer | 12.5 | 13 | Difficult |
| Densilk | LDPE | Monolayer | 25 | 41 | Easy |
| LDPE | LDPE | Monolayer | 50 | 101 | Easy |
| Isofolan | HDPE | Monolayer | 100 | 112 | Very Easy |
| EVA 18 | EVA (18% VA) | Monolayer | 75 | 124 | Difficult |
| FT 8000-15C | LDPE:EVA (18% VA) | Monolayer | 75 | 126 | Poor |
| FT1975 | LLDPE + EVA (9%) | Monolayer | 75 | 137 | Fair |
| FT2004 | EVA (9%)/LLDPE/EVA (9%) | Three Layer | 50 | 112 | Easy |
| Low MI PP | Random Copolymer PP with MI of 0.5 | Monolayer | 50 | 120 | Easy |

Example 4. Effect of Film Size and Shape on Crease Lines

If the film folds or forms creases during thermoforming the crease lines pattern may be transferred to the thermoformed article which is undesirable. The size of the film was not expected to have a significant effect as that does not change any of the film's inherent properties. Films were prepared having different shapes, sizes and configurations from a 50 micron multilayer film (FT 2004) and tested by thermoforming over a trapezoidal cylinder with a height of 24 mm a base of 44 mm and a top of 41 mm. The distance, number and depth of crease marks on the thermoformed parts are listed in Table 3.

TABLE 3

| Film dimension (mm) | Shape | Alterations | Crease length (mm) | # of Creases |
|---|---|---|---|---|
| 110 | Circle | None | 22 | 20 |
| 110 | Circle | 4 radial slits | 21 | 14 |
| 110 | Circle | Fluted | 19 | 18 |
| 110 | Circle | 4 triangular cuts | 19 | 16 |
| 110 | 20 mm high cone | None | 18 | 12 |
| 125 | Circle | None | 18 | 18 |
| 125 | Circle | 4 triangular cuts | 16 | 14 |
| 140 | Square | None | 18 | 12 |
| 125 | Partial Hemisphere | Height 30 mm | 12 | 8 |

Surprisingly the results showed that the size of the film and even the shape has a strong effect on its performance. Specifically, the performance was better as film increased from 110 mm to 125 mm, however films greater than about 125 mm were prone to blocking air flow. Additionally, the inventors discovered that slitting the perimeter of the film reduced amount and number of surface defects. Further improvement were observed when triangular sections were removed from the perimeter of the film.

Additional advantageous results were obtained by pleating the film, making it cone or bowl shaped with a Z axis height of >about 10 mm. One skilled in the art can prepare other related geometric improvements that allow the sheet to more readily conform to the model being used.

Example 5. Effect of Film on Ease of Separation

Tests were conducted to measure the ability of the films to facilitate separation of thermoformed sheets from a polyester fabric. Various thermoformable sheets were thermoformed over a polyester fabric placed on an acetal block with and without test separator films as reported in Table 4.

TABLE 4

| Thermoformable Sheet | Sheet Composition | Model | Surface Layer | Film | Removal Force (g) |
|---|---|---|---|---|---|
| Zendura A | Polyurethane | Acetal Block | PET Fabric | None | 577 |
| Zendura A | Polyurethane | Acetal Block | PET Fabric | FT 2004 | 34 |
| Essix Ace | Polyester | Acetal Block | PET Fabric | None | 469 |
| Essix Ace | Polyester | Acetal Block | PET Fabric | FT 2004 | 28 |
| Zendura A | Polyurethane | Acetal Block | PET Fabric | EVA (18% VA) | Film Tears |
| Polycarbonate | Polycarbonate | Acetal Block | PET Fabric | None | 368 |

TABLE 4-continued

| Thermoformable Sheet | Sheet Composition | Model | Surface Layer | Film | Removal Force (g) |
|---|---|---|---|---|---|
| Polycarbonate | Polycarbonate | Acetal Block | PET Fabric | FT 2004 | 34 |

Separator films with low polarity levels produce higher gloss surfaces and significantly reduced the force required to separate the model from the thermoformed article. Multilayer films with a relatively polar outer skin and non polar inner layer performed particularly well.

Example 6. Dual Function Separator Film

Separator films were evaluated for utility as protective film by direct application to thermoformable sheets before thermoforming.

A three layer film was prepared having an A and C layer comprised of 93% of an and EVA with a melt index of 2.5 having 18% vinyl acetate, 5% of a LLDPE with a melting point of 97 C having a melt index of 2 and 0.5% of erucamide slip agent and 1.5% of silica as antiblock (COEX 18). The B layer was an LLDPE with a melting point of 107 C having a MI of 2 and containing 0.5% of erucamide. Each of the A, B and C layers were 25 microns providing a total thickness of 75 microns.

Two additional films were prepared adjusting the ratio of 18% EVA and LLDPE such that the outer layers contained 12% and 9% of VA. These materials are referred to as COEX 18, COEX 12 and COEX 9.

Two commercial protective films were obtained from Novacel, 9026 and 9884 Novacell 9026 is a polyethylene film having a very low tack adhesive which has an FTIR spectrum consistent with polyethylene. Novacel 9884 is a polyethylene film having a low tack acrylic adhesive. Both films are marketed for use in protecting thermoformable sheets Films 50 microns thick were prepared from Elvax 240, 28% VA containing EVA with a melt Index of 43 and a melting point of 74° C., designated EVA 28. Films were prepared from Elax 460, 18% VA having a MI of 2.5 and a melting point of 84° C., designated EVA 18

Films were prepared from Elvax 240 and Elvax 460 as above with added 0.5% Incroslip SL a proprietary slip additive manufactured by Croda and with 5% of Dow Corning HMB-6301 Masterbatch a non-migrating silicone slip additive.

The prepared films were heat laminated to Zendura polyurethane and removal force tested before and after thermoforming. To be useful the film must bond sufficiently to the thermoformable sheet to withstand handling, and yet after thermoforming must remove cleanly without tearing or leaving a residue. The preferred initial adhesion level is around 10 grams/inch after lamination. Lower levels of adhesion are not adequate to keep the film attached during handling. Values greater than about 50 g/cm are too high as it can be difficult to remove. After thermoforming ideally, the adhesion levels do not change, however values less than about 100 g/cm are acceptable. Higher values are unacceptable and usually result in the film tearing or splitting during removal. Results are shown in Table 5.

TABLE 5

| | Peel Force | | |
|---|---|---|---|
| Film | After Lamination | After Thermoforming | Utility Pass/Fail |
| COEX 18 | 10.2 | >200 | Fail |
| COEX 12 | 5.5 | 136.2 | Fail |
| COEX 9 | 10.2 | 15.4 | Pass |
| Novacel 9026 | 3.9 | 18.5 | Fail |
| Novacel 9084 | 62.6 | >200 | Fail |
| EVA 28 | 47.2 | >200 | Fail |
| EVA 18 | 12 | 184.0 | Fail |
| EVA 28 + Slip | 50 | 138 | Fail |
| EVA 18 + Slip | 12 | 25 | Pass |
| EVA 18 + Silicone | 12 | 36 | Pass |
| EVA 28 + Silicone | 22.8 | 87.0 | Pass |

The results demonstrate that the presence of high levels of polar monomers is undesirable, the advantage of multilayer films in achieving a balance of adequate adhesion and clean removability. Additionally, they show that addition of slip agents can maintain a controlled level of adhesion after laminating and thermoforming even in the presence of polar monomers

What is claimed is:

1. A system for producing a thermoformed dental appliance, comprising,
    (a) a male or female mold or model;
    (b) a thermoformable sheet material;
    (c) a detached releasable separator film having an X and Y dimension and comprising (i) an average thickness of from about 37 to 75 microns; (ii) a melting point which is lower than a thermoforming temperature of the thermoformable sheet material; (iii) a trouser tear strength of greater than 20 N/mm; and (iv) a peel force adhesion level after thermoforming of less than about 100 g/cm, wherein the detached releasable separator film includes a) two or more radial slits formed along a perimeter of the releasable separator film, or b) two or more triangular cutouts formed along the perimeter of the releasable separator film, c) multiple radial creases, or d) a conical or a hemispheric shape, wherein a Z axis of the conical shape or hemispheric shape has a height of greater than about 10 mm; and
    (d) a thermoforming device.

2. The system according to claim 1, wherein the detached releasable separator film comprises a machine direction (MD) and transverse direction (XD) orientation of less than 100%.

3. The system according to claim 1, wherein the detached releasable separator film comprises a minimum X or Y dimension of about 110 mm and a maximum X or Y dimension of about 150 mm.

4. The system according to claim 1, wherein the detached releasable separator film comprises a polypropylene copolymer or a polyolefin.

5. The system according to claim 1, wherein the detached releasable separator film comprises a single layer, two or more layers wherein one layer has a higher melting point than another layer, or three layers wherein the inner layer has a higher melting point than either outer layer.

6. The system according to claim 1, wherein the detached releasable separator film has a melt index according to ASTM D1238 of:
    (a) less than 10, at a temperature of 230° C. with a load of 2.16 Kg;

(b) from about 2 to 50, at a temperature of 150° C. with a load of 2.16 Kg; or (c) from about 2 to 35, at a temperature of 190° C. with a load of 2.16 Kg.

7. The system according to claim 1, wherein the detached releasable separator film comprises one or more of:
 a slip or mold release agent selected from the group of amides, esters and siloxanes; and
 from 0.1 to 2% of an anti-block additive selected from silica, diatomaceous earth, talc, and calcium carbonate.

8. The system according to claim 1, wherein:
 the two or more radial slits are each greater than about 10 mm in length; or
 the two or more triangular cuts comprise from about 5% to about 50% of the total area.

9. A system for producing a thermoformed dental appliance, comprising,
 (a) a male or female mold or model;
 (b) a thermoformable sheet material;
 (c) a detached releasable separator film comprising (i) an average thickness of from about 37 to 75 microns; (ii) a melting point which is lower than a thermoforming temperature of the thermoformable sheet material; (iii) a trouser tear strength of greater than 20 N/mm; and (iv) a peel force adhesion level after thermoforming of less than about 100 g/cm,
 wherein the detached releasable separator film includes a) two or more radial slits formed along a perimeter of the releasable separator film, or b) two or more triangular cutouts formed along the perimeter of the releasable separator film, or c) multiple radial creases; and
 (d) a thermoforming device.

10. The system according to claim 9, wherein the detached releasable separator film comprises a machine direction (MD) and transverse direction (XD) orientation of less than 100%.

11. The system according to claim 9, wherein the detached releasable separator film comprises a minimum X or Y dimension of about 110 mm and a maximum X or Y dimension of about 150 mm.

12. The system according to claim 9, wherein the detached releasable separator film comprises a polypropylene co-polymer or a polyolefin.

13. The system according to claim 9, wherein the detached releasable separator film comprises a single layer, two or more layers wherein one layer has a higher melting point than another layer, or three layers wherein the inner layer has a higher melting point than either outer layer.

14. The system according to claim 9, wherein the detached releasable separator film has a melt index according to ASTM D1238 of:
 (a) less than 10, at a temperature of 230° C. with a load of 2.16 Kg;
 (b) from about 2 to 50, at a temperature of 150° C. with a load of 2.16 Kg; or
 (c) from about 2 to 35, at a temperature of 190° C. with a load of 2.16 Kg.

15. The system according to claim 9, wherein the detached releasable separator film comprises one or more of:
 a slip or mold release agent selected from the group of amides, esters and siloxanes; and
 from 0.1 to 2% of an anti-block additive selected from silica, diatomaceous earth, talc, and calcium carbonate.

16. The system according to claim 9, wherein:
 the two or more radial slits are each greater than about 10 mm in length; or the two or more triangular cuts comprise from about 5% to about 50% of the total area.

\* \* \* \* \*